United States Patent [19]

Clary

[11] 4,051,649
[45] Oct. 4, 1977

[54] FRUIT HARVESTING MACHINE

[75] Inventor: Roger Clary, Loudun, France

[73] Assignee: Howard Machinery Limited, Bury St. Edmunds, England

[21] Appl. No.: 620,414

[22] Filed: Oct. 7, 1975

[30] Foreign Application Priority Data

Oct. 8, 1974 France .................................. 74.33868
Aug. 25, 1975 France .................................. 75.26175

[51] Int. Cl.² .......................................... A01D 46/00
[52] U.S. Cl. .................................................. 56/330
[58] Field of Search ............................ 56/330, 328, 29

[56]    References Cited
    U.S. PATENT DOCUMENTS

| 3,255,578 | 6/1966 | Pertics | 56/330 |
| 3,325,984 | 6/1967 | Christie et al. | 56/330 |
| 3,959,959 | 6/1976 | Louault et al. | 56/330 |

Primary Examiner—Russell R. Kinsey
Attorney, Agent, or Firm—Wegner, Stellman, McCord, Wiles & Wood

[57] ABSTRACT

A machine for gathering fruit by a shaking and beating action includes a wheeled frame with a longitudinal central tunnel through which the plants pass. A series of groups of flexible beater fingers flank the longitudinal axis of the tunnel, and the beater fingers of each group are on carrier means on a connecting rod which has one end operatively connected to a driver eccentric and the opposite end carried upon a slide block secured to the machine frame. Each group of beater fingers moves generally elliptically so the flexible fingers have a whipping action which shakes the plants to dislodge the fruit.

The machine has several adjustments which adapt it to harvesting fruit from a variety of plants, and in particular for gathering grapes from vines of different kinds, sizes and dispositions.

10 Claims, 13 Drawing Figures

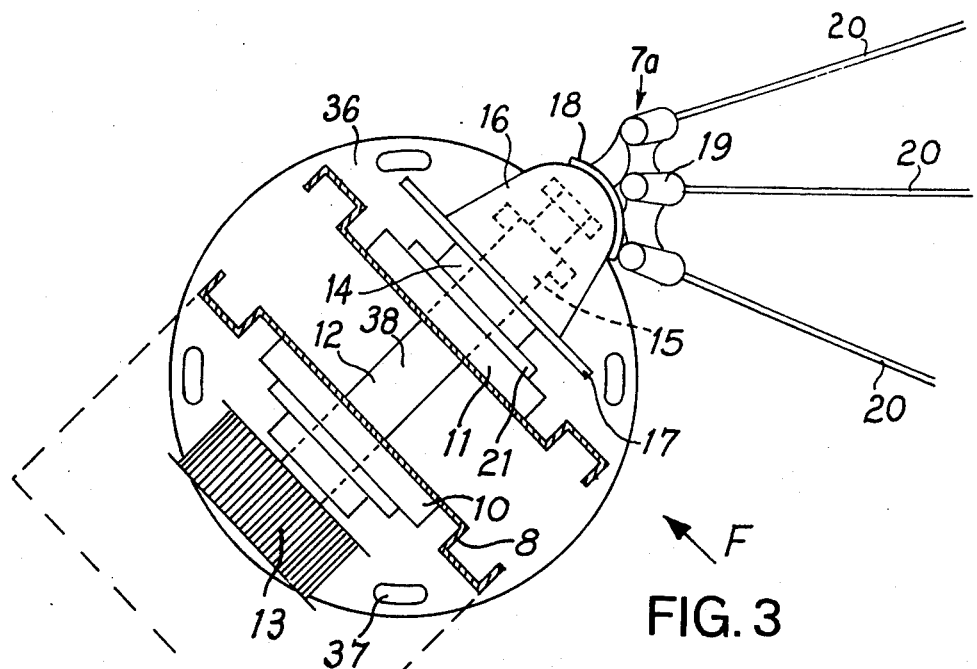
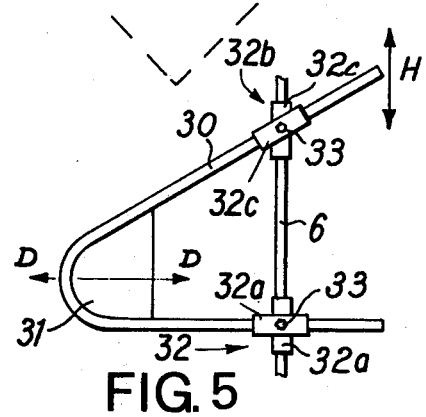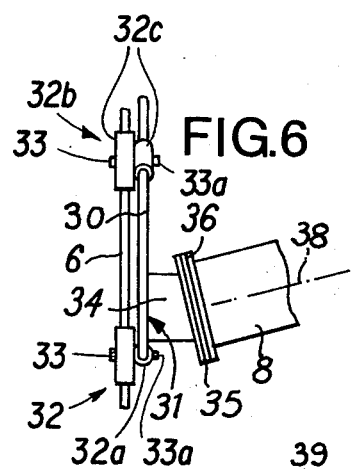
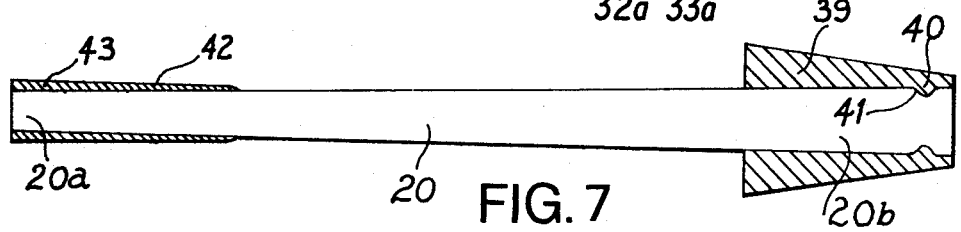

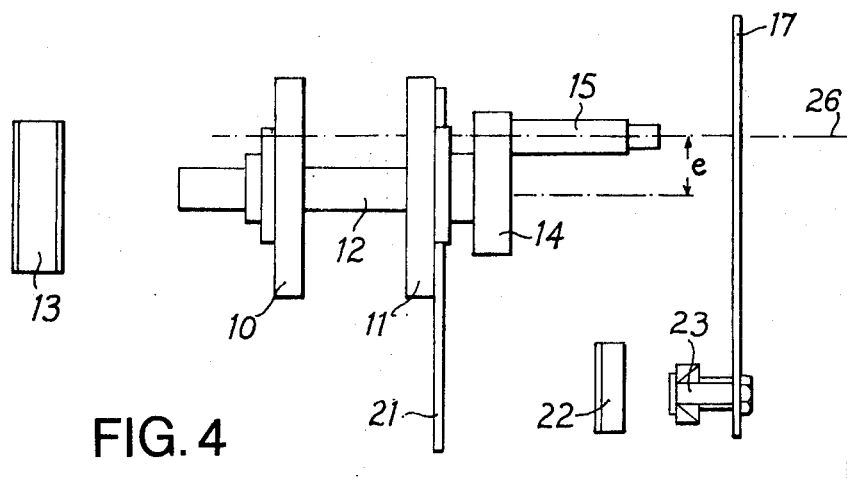
FIG. 4
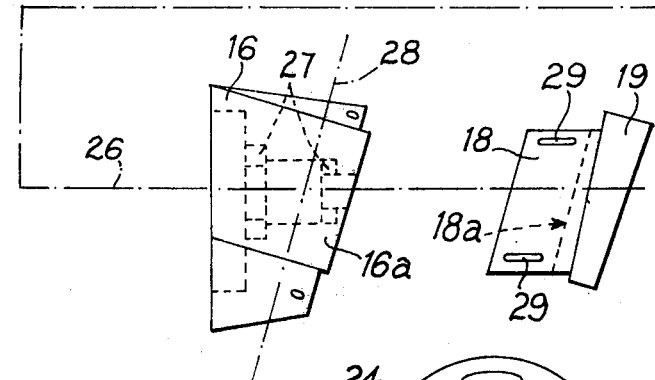
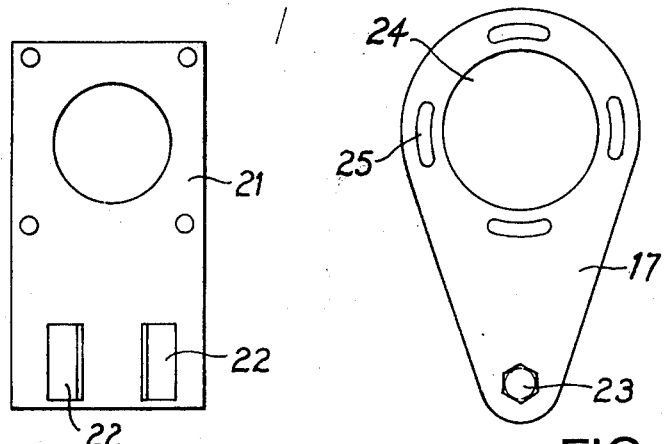
FIG. 4A   FIG. 4B

4,051,649

FRUIT HARVESTING MACHINE

This invention relates to a machine for mechanically gathering fruit, particularly but not exclusively grapes.

The gathering of grapes is traditionally done by hand and there is a labour problem which is difficult to resolve because of the increasing scarcity of such labour. Mechanisation of grape gathering has been tried for resolving this problem. The known machines work on the same principle of knocking the vine to make the fruit fall onto a base from which it is removed by conveyor towards towed storage means. The knocking or shaking is effected by sets of radially extending beater fingers which are rotated about a vertical axis or a horizontal axis or an inclined axis.

The principal object of the present invention is to provide a machine in which groups of flexible beaters are given a whipping action which shakes the fruit from plants.

For this purpose, according to the invention, a machine for gathering fruit comprises a frame mounted on a wheeled vehicle chassis, the frame constituting a tunnel disposed along the longitudinal axis of the vehicle and being closed at its base by a closure movable away from the longitudinal axis of the vehicle to allow the fruit plants to pass therethrough, at least two assemblies of flexible beater fingers being movably mounted in the interior of the tunnel and actuated by a motor for causing the fruit to fall, the two assemblies being disposed symmetrically with respect to a central vertical axis extending longitudinally of the machine. In a first embodiment of the invention the beater fingers of each assembly are arranged in groups and are each fixed at one of their ends on a carrier means which takes the form of a drum mounted on a connecting rod, the other end portion of which is movable in slide blocks on a bracket that is adjustably attached to the machine chassis, and the connecting rod being pivoted on a pivot pin arranged eccentrically to a shaft coupled for rotation by the motor.

In one embodiment of the invention the shaft is inclined downwardly from a horizontal plane through the machine.

In another embodiment of the invention the shaft is carried vertically by a horizontal element of the chassis extending along an internal flank of the tunnel and carrying at each of its ends an eccentric pin, the connecting rod being formed by upper and lower parallel horizontal elements extending into the interior of the tunnel in a direction substantially transverse to the longitudinal axis of the machine, each of the connecting rod elements being pivoted at one of its ends on the corresponding pin and the upper element having its other end slidable along the bracket in fixed slide blocks attached to the bracket which extend horizontally in a direction transverse to the longitudinal axis of the machine. Carrier means for the beater fingers comprises a plate mounted between the connecting rod elements adjacent the slide blocks.

In addition to achieving an improved more effective beater finger motion, the machine of the present invention provides greatly increased versatility of operation by affording several precise adjustments of the beater fingers relative to the vertical longitudinal median plane of the tunnel and relative to the carrier means on which they are mounted.

This obviates a major problem of prior art machines which is that they do not permit precise adjustment of the manner of shaking which is desirable for each type of vine and this often leads either to a loss of juice — the fruit being crushed — or, on the other hand to a loss through non-removal of the fruit. Moreover those machines, by their construction, are not adapted for use with non-staked vines.

Further features of the invention will become apparent from the following description of two embodiments of the invention given by way of example only and with reference to the drawings, in which:

FIG. 3 is a fragmentary section on an enlarged scale on the line III—III in FIG. 1;

FIG. 4 is an exploded schematic view of part of the assembly shown in FIG. 3, seen in the direction indicated by the arrow F in FIG. 3;

FIGS. 4A and 4B are elevational views of two parts of said assembly;

FIGS. 5 and 6 are views of details of the machine;

FIG. 7 is a view of a beater finger for the machine, partly in section;

Figure 1:
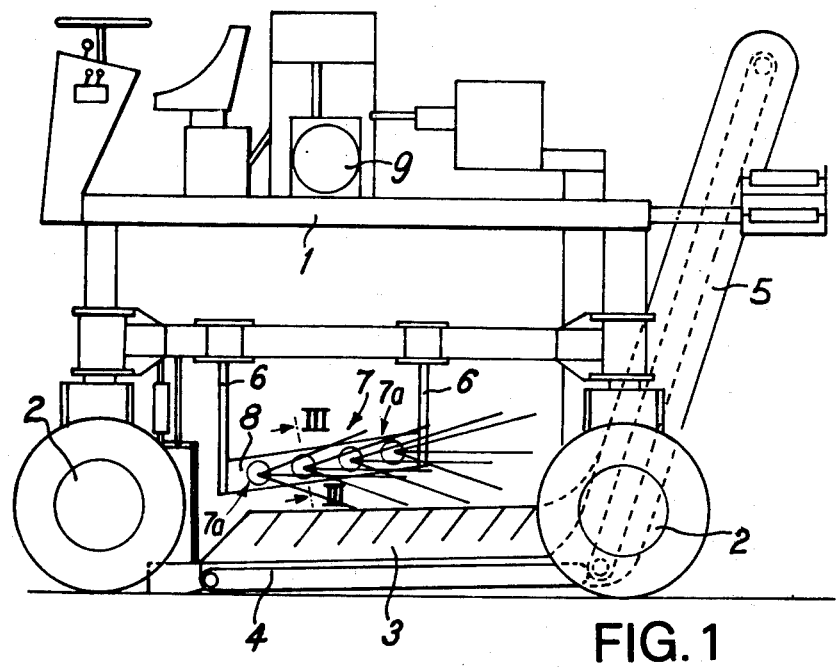
FIG. 1 is a side elevation of one embodiment of the machine according to the invention.
Figure 2:
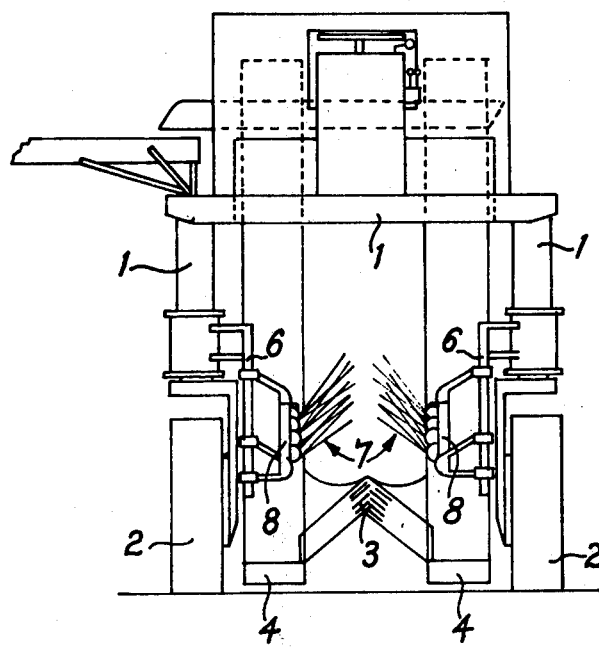
FIG. 2 is an end view of the machine of FIG. 1.
Figure 8:
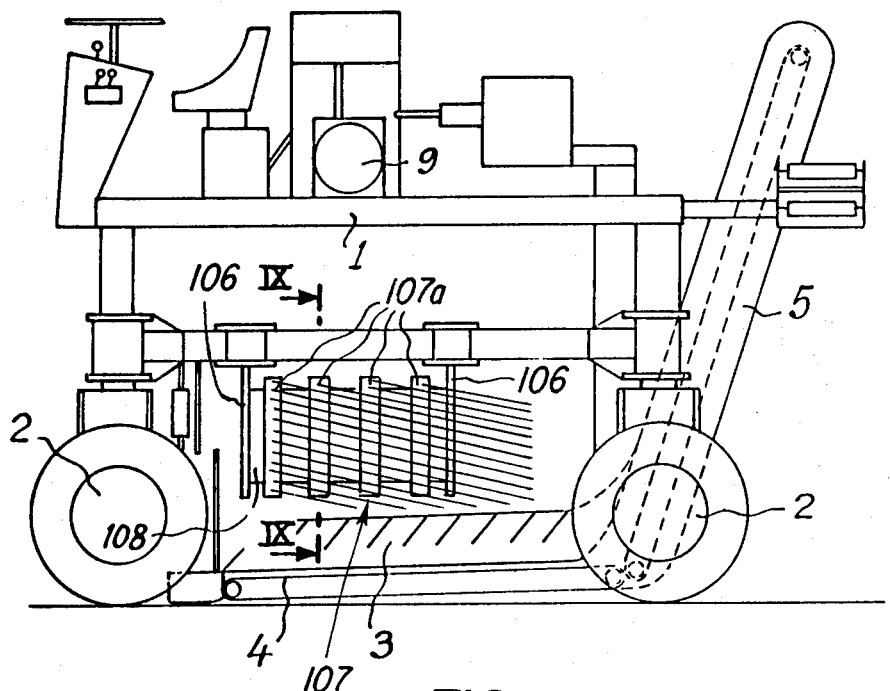
FIG. 8 is a side elevation of a second embodiment of a machine according to the invention.

Referring first to the embodiment of FIGS. 1 to 7, a fruit gathering machine consists of a vehicle chassis 1 in the form of a frame having wheels 2. The machine forms a kind of tunnel whose base 3 constitutes a series of articulated elements which are movable laterally to allow the passage of the fruit plants, in known manner. The base 3 has to each side of its central axis two lateral slopes which lead to longitudinal transport belts 4. A pair of discharge conveyors 5 which are shown as belt conveyors enable the gathered fruit to be discharged.

The chassis 1 carries through lateral vertical mountings 6 beating mechanisms 7 situated symmetrically along each of the internal flanks of the tunnel with respect to a central longitudinal plane of the machine. The beating mechanisms comprise two symmetrical series of four groups 7a of three beater fingers all of which series are mounted on a bracket 8. These mechanisms are actuated by means of a transmission (not shown) which is known in itself and is driven by a motor 9.

Referring now particularly to FIG. 3 the different elements making up one of the groups are shown. The bracket 8 carries a shaft 12 by means of two discs 10 and 11 and the shaft is rotated by means of a pulley 13 coupled to the transmission. The shaft 12 carries a crank arm 14 to which is eccentrically attached a pin 15. The end of the pin 15 is mounted for rotation in a carrier means, indicated generally at 16, which comprises a drum with a first part 16a fixed to one end portion of a connecting rod 17, and a second part 18 attached to 16a. The pin 15 passes through an opening 24 (FIG. 4B) in said one end portion of the connecting rod 17, and at the other end portion is an axle and roller means 23 which is carried in fixed slide blocks 22.

FIGS. 4, 4A and 4B show these different elements more clearly. The second drum part 18 carries mounting sockets 19 for beater fingers 20.

FIG. 4 shows the various elements of FIG. 3 detached from one another, excluding the bracket 8, as seen in the direction F in FIG. 3. The disc 11 is fixed to the bracket 8 and carries a member 21 whose shape can be seen in FIG. 4A. The member 21 mounts the two slide blocks 22. FIG. 4B shows that the circular opening 24 in the connecting rod 17 is surrounded by arcuate slots 25 which are arranged to receive means (not shown) which secure the part 16a of the drum on the connecting rod. The slots 25 permit an adjustment of the orientation of the drum on the connecting rod 17 about the axis 26 of the eccentric pin 15.

The amount of eccentricity e of the pin 15 is adjustable in a known manner.

The part 16a of the drum is mounted for rotation on the end of the pin 15 by two roller bearings 27. The drum part 16a has at its outer end a cylindrical surface 16b having an axis 28 which intersects the axis 26 and the surface 16b is abutted by a cylindrical surface 18a of the second part 18 of the drum. Securing means (not shown) for the part 18a impale the slots 29 which enable an adjustment about the axis 28 of the orientation of the second part 18 of the drum with respect to the first.

Referring now to FIGS. 5 and 6, these show the attachment device whereby one end of the bracket 8 is attached to the corresponding vertical mounting 6. The device is formed by a rod 30 fixed to a support plate 31. A lower member 32 is formed by two tube portions 32a brazed together at right angles, and an upper member 32b consists of tube portions 32c brazed together at a predetermined angle in relation to one another; and said members 32a and 32b are capable of being secured by screws 33 to the rod 30 and by screws 33a to the mounting 6. Accordingly the rod 30 can be moved in the directions of the arrows D with respect to the mounting 6 and also in the directions of the arrows H with respect to the mounting. Once the chosen position is reached the members 32 are locked on each of the parts.

The plate 31 (FIG. 6) carries through a bevel member 34 an inclined disc 35. This disc 35 cooperates with a second disc 36 carried by the end of the bracket 8. The screw fixing means of the disc 36 on the disc 35 pass through the slots 37 (FIG. 3) which allows an adjustment of the orientation of the bracket 8 about its longitudinal axis 38. Of course the other end of the bracket 8 is attached to the corresponding vertical mounting 6 by identical means.

Referring now to FIG. 7 a beater finger 20 is preferably formed of glass fiber and resin having a taper such that its free end 20a is narrower than its other end 20b. At its end 20b the finger is fitted with a rubber sleeve 39 prevented from movement relative to the finger by a projection 40 cooperating with a groove 41 formed in the finger. The sleeve 39 has a conical external surface of which the taper is such that when it is forced into the conical mounting socket 19 (FIGS. 3 and 4) the locking action obtained gives a rigidity increased with the reduction in diameter of the seating. This is particularly the case when the taper of the sleeve 39 is less than the taper of the mounting socket 19. The free end 20a of the finger is provided with a sleeve formed by a cylindrical or conical metal socket 42 having an inclination opposite to that of the finger and having a narrow space enclosed between the socket and the finger filled with flexible rubber 43.

The machine thus far described operates as follows. The movement of the motor is transmitted to the pulley 13 by known means which can comprise a hydraulic transmission device with cardan joints. The shaft 12 is rotated and the circular movement of the pin 15 is converted into a generally elliptical movement of the drum 16a–18 by the connecting rod 17. It will be apparent that each point of the drum 16a–18 describes an ellipse. This movement is transmitted to the group of three fingers 20 supported in the sockets 19 and the free ends of the fingers describe movements substantially elliptical accompanied by a whipping effect due to their elasticity and to the non-uniform velocity to which they are subjected. The amplitude and the nature of the movement of the ends is adjusted according to the kind of vine on which they are operating.

The bevelled members 34 give the brackets 8 an inclination longitudinally of the machine as seen in FIG. 1. This inclination is, as shown, fixed but it can be seen that a set of members 34 at a different angle can be used or the members 34 can be in two parts pivoted to one another about an axis parallel to the plane of the disc 35. This inclination is such that the bracket 8 has its lowest point toward the front of the machine as is apparent in FIGS. 1 and 2.

By reason of the members 32 and their rods 30 the height of the bracket 8 can be adjustably inclined with respect to the ground and to its disposition in the interior of the tunnel according to the size of vine plants and of the average height at which the fruit is located.

Adjustment of the discs 36 on the discs 35 determines the inclination with respect to the horizontal of the shafts 12. An inclination of about 45° is preferred. This inclination determines the parallel plane in which the drum 16a–18 revolves and thus the foot of each of the fingers located in the mountings 19. The beater fingers 20 are arranged generally towards the rear of the machine. By changing the orientation of the parts 16a–18 of the drum with respect to the support 17 about the axis 26 an end adjustment is obtained of the transverse position of the ends of each of the fingers in the tunnel. The two adjustments permit, acting on a group of three fingers at a time, regulating the area swept by the fingers.

By adjusting the eccentricity e of the pin 15 with respect to the shaft 12 one varies the amplitude of the elliptical movement transmitted to the fingers, and thus the whipping effect of the ends of the fingers.

The foregoing describes the adjustment of a single bracket 8 and of a single group of fingers; but the same adjustments may be made to the other bracket 8 and to each of the four groups of fingers which are carried by each bracket.

To avoid heavy machine vibrations the groups of fingers should be arranged in relation to one another in a manner such that the movements of one cancel out the movements of the other.

We refer now to FIGS. 8 to 11 in which a second embodiment is shown, this second embodiment having been developed as a result of practical experience with the previously described embodiment. Such practical experience has shown that only certain adjustments need to be effected, the others being secondary. Moreover the machine of the second embodiment possesses several particular characteristics which reduce the number of adjustments required. Referring first to FIG.

8, the machine is generally similar to that of the previous embodiment having a chassis 1 mounted on wheels 2 and forming a tunnel with a base 3. The chassis 1 carries beating mechanisms 107 by means of vertical lateral mountings 106. Again the beaters 107 comprise two symmetrical series of four groups 107a of beater fingers each of which series is mounted on a horizontal bracket 108. The beaters are actuated by a motor 9 through a transmission (not shown).

Figure 9:
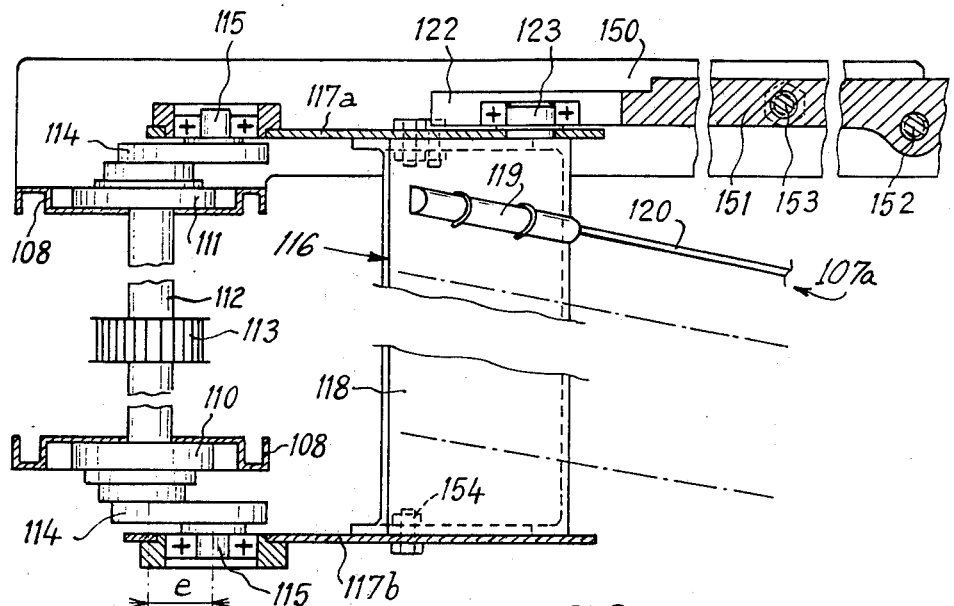
FIG. 9 is a fragmentary section on an enlarged scale on the line IX—IX in FIG. 8, showing the beater finger mounting on one side of the machine.

FIG. 9 shows the different elements forming the groups of beaters. The bracket 108 is in the form of a beam which is fixed on the mountings 106 in a similar manner to the bracket 8 of the previous embodiments, thereby enabling the height of the bracket to be regulated. The bracket 108 through two discs 110 and 111, carries a shaft 112 capable of being rotated by means of a pulley 113 cooperating with the transmission. The shaft 112 carries at each of its ends crank 114 to which is attached a pin 115 in the manner of an eccentric.

The pins 115 are connected for rotation respectively with an upper element 117a and a lower element 117b which constitute a connecting rod 117 on which is mounted a carrier means 116 consisting of a plate 118 carrying mountings 119 for the beater finger 120. The form of the plate 118 can also be seen in FIG. 10.

The end portion of the upper element 117a opposite the pin 115 carries a member 123 formed of an axle and a roller which cooperates with a slide block 122 which extends transversely with respect to the longitudinal axis of the machine and is adjustably attached to a cross-member 150, also transverse, fixed to the beam 108.

As in the previous embodiment the eccentricity e of the pins 115 is adjustable by known means. The plate 118 is fixed to the upper and lower elements 117a and 117b of the connecting rod 117 by means of screws 154 which impale arcuate slots 155 in said elements so the orientation of the plate 118 can also be adjusted with respect to the connecting rod 117.

The slide block 122 is carried by an end of a support element 151 whose other end is provided with a similar slide block (not shown) cooperating with the connecting rod of the group of beater fingers directly across the chassis from those shown in the drawings. The support element 151 of the slide block 122 is attached to the cross-piece 150 by the rods 152 and 153, and also by another rod like 153 symmetrical thereto with respect to the rod 152. The rod 152 is rotatably mounted in the cross-piece 150 and has a screw-thread on a part of its length which engages a threaded hole in the element 151 or a threaded nut fixed on the element 151.

The rod 153 slides freely in the cross-piece 150. It also has a screw thread which passes freely through the element 151. Nuts 156 enable the element 151 to be adjustably fixed on the rod 153.

The rod 153 also extends freely through other cross-members like 150 disposed along the machine and other elements such as 151a, in other groups of beater fingers on the same side of the machine, are adjustable on the rod 153 by nuts such as 156a. It can be seen that with such a system rotation of the rod 152 causes a relative longitudinal displacement of the equipment formed by the rods 153, the support elements 151 and the slide blocks 122, with respect to the cross-members 150.

Each group 107a of beater fingers has mountings like those just described, so that all may be adjusted in the machine frame.

Figure 11:
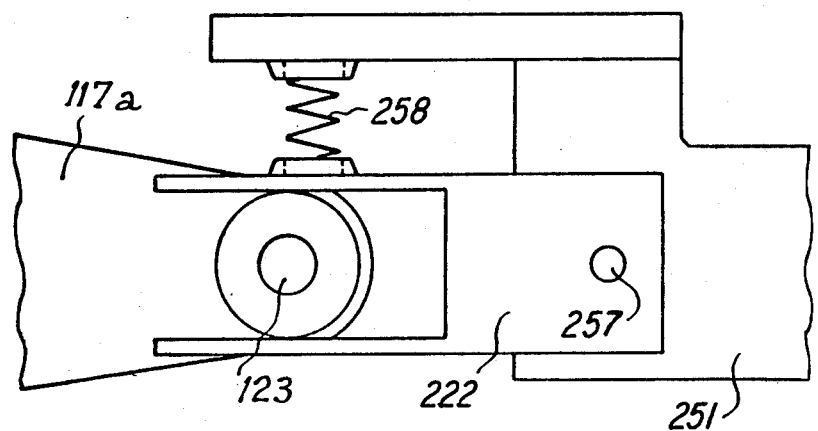
FIG. 11 is an alternative detail to that shown in FIG. 10.

FIG. 11 shows a detail of an alternative mounting of a slide block 222 on a support element 251 enabling withdrawal of the beater fingers 120 when they encounter a hard obstacle. The slide block 222 is pivoted on the support element 251 about a vertical axis 257. A resilient member 258, attached between an extension arm 251a of the element 251 and the slide block 222, enables the slide block 222 to be maintained in a fixed position with respect to the support element 251 such that the force to which the slide block is subjected is not greater than the resistance of the resilient member. The latter can be formed by a spring or other suitable means such as rubber, elastomer or a hydraulic system with an exhaust valve.

The second embodiment of the invention operates substantially the same as the previous embodiment. The shaft 112 is rotated to transmit, through the eccentrics 115 and the connecting rod 117, an elliptical movement to the plate 118. This movement is transmitted to the group of beater fingers located in the mountings 119 and the free ends of these fingers describe a substantially elliptical movement accompanied by a whipping effect due to their flexibility and to the non-uniform velocity to which they are subjected.

A first adjustment of the machine is to the arrangement of fingers 120 (of their greater or smaller obliquity in the tunnel) the position of the plate 118 in relation to the connecting rod 117 being adjusted by means of the screws 154 and slots 155.

One can also cause a second adjustment relative this time to the inclination to the groups of fingers with respect to one another. By means of the nuts 156 it is possible to individually fix the support elements 151 on the rods 153.

Figure 10:
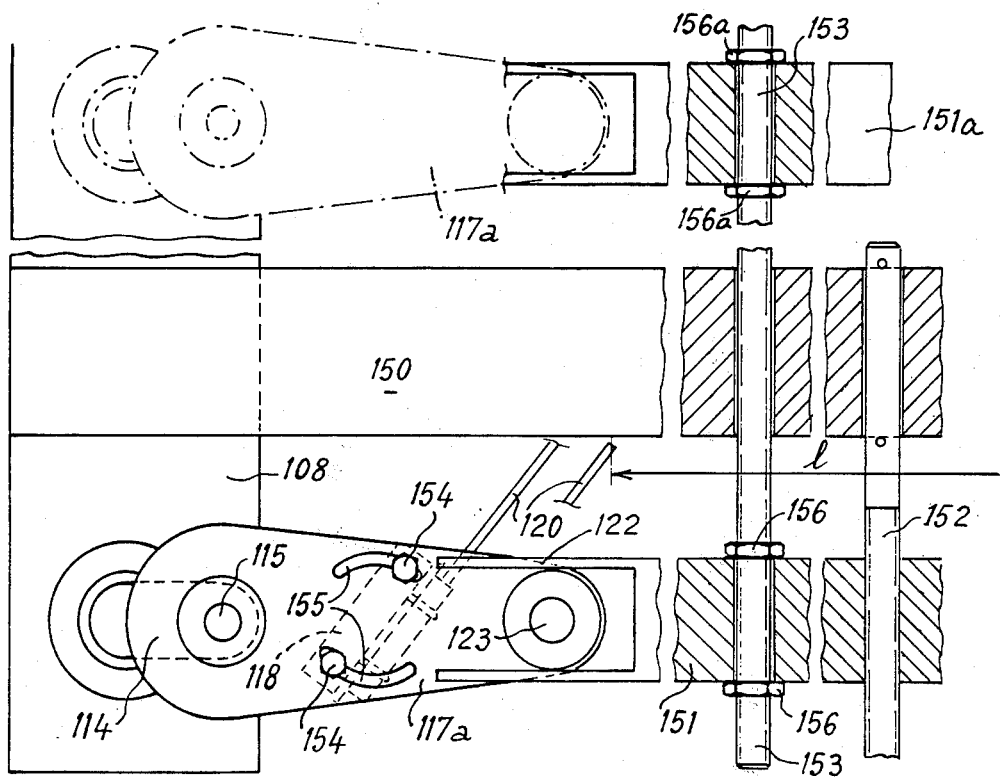
FIG. 10 is a somewhat diagrammatic view, partly in section, showing the elements of FIG. 9 from above and the next adjacent beater finger mounting.

If the position of all the support elements such as 151 and 151a is as shown in FIG. 10, that is, in the extension of the righthand side fastening through the center of the shaft 112 and the center of the pin 123, all the fingers 120 have the same inclination and the distance 1 will be equal for each pair of cooperating groups of fingers which the machine has. If, however, the element 151a — the upper element in FIG. 10 — is brought nearer the lower element 151, supposed fixed, by action of the nuts 156a this movement carries the corresponding support 117 in rotation about the pin 115 which leads to a more pronounced inclination of the plate 118 and a reduction of the distance 1 such as is existing between the two groups of fingers 120.

A different spacing 1 between the fingers can be obtained according to the transverse angle of the machine.

It is possible also to vary the spacing 1 by means of the threaded rod 152. A rotation of the latter causes movement of all the elements such as 151 and 151a, with a rotation of all the crank shafts 117 about the pins 115.

It is possible that a finger or group of fingers can encounter a hard obstacle which can cause a breakage. For preventing this happening the arrangement of FIG. 11 permits a finger or a group of fingers to move away from the obstacle. The obstacle encountered by the fingers tends to push the fingers laterally with an effort more than that imparted by the obstacle. There is thus created a force to the plate 118 tending to make it turn in the direction of minimum inclination.

The force having reached a higher intensity than that of the flexible member 258 maintaining the slide block 222 in alignment with the element 251 while member 258 compresses itself, permitting the support 117 to turn about the pin 115 in the direction to reduce the inclination of the plate 118. The obstacle having passed, the member 158 brings back the support 117 and thus the plate 118 into its initial inclination.

The machine of the invention is specially adapted for gathering grapes by beaters by means which do not damage the vines and do not squash the grapes. This results in minimum loss of juice compared with known machines. Moreover the oblique beating reduces the penetration of the beaters into the stalk of the vine and the elliptical movement of their ends permits an improved fruit gathering result.

The several adjustment possibilities permit the machine to optimise the gathering capabilities with different types of vine and under different atmospheric conditions.

The invention finds particular application in the field of agricultural machine construction.

I claim:

1. A machine for gathering fruit from plants comprising, in combination:
   a wheeled chassis;
   a frame on said chassis;
   a tunnel defined by the frame and extending longitudinally of the machine;
   closure means mounted on the lower part of the frame and closing the base of the tunnel, the closure means being movable away from the longitudinal axis of the machine to allow the plants to pass through the tunnel;
   at least one group of flexible beater fingers disposed at each side of the longitudinal axis of the machine; and
   a drive assembly for driving each group of beater fingers in a generally elliptical movement, the drive assembly comprising,
   drive means,
   an eccentric driven by the drive means,
   a connecting rod of which one end is operatively connected to the eccentric,
   a slide block operatively connected to the other end of the connecting rod,
   and carrier means attached to the connecting rod and carrying the beater fingers.

2. The combination of claim 1 wherein the groups of beater fingers are disposed on brackets extending along the sides of the tunnel and each drive assembly comprises a shaft driven by the drive means, the shaft extending vertically and being journalled on the associated bracket, an eccentric at each end of the shaft, the connecting rod being formed of two elements each connected to one of said eccentrics and extending generally transverse to the longitudinal axis of the machine, each of the connecting rod elements being operatively connected to the carrier means remote from the associated eccentric and one of the elements being connected to the slide block which is mounted on a cross member extending transverse to the longitudinal axis of the machine.

3. The combination of claim 2 wherein the carrier means has adjustment means whereby it can be moved relative to the connecting rod about an axis parallel to the axis of the shaft.

4. The combination of claim 1 which includes means adjustably connecting the slide block to the cross member for adjustment in a direction parallel to the longitudinal axis of the machine.

5. The combination of claim 1 in which the carrier means comprises a drum which has two parts, means mounting the first of said parts on the connecting rod for adjustment about a first axis, and means mounting the second of said parts on the first of said parts for adjustment about a second axis.

6. The combination of claim 1 in which the carrier means comprises a plate, means are provided mounting said plate on the connecting rod for adjustment about an axis in the longitudinal plane of the plate, and mountings which provide sockets for the beater fingers are secured flat on the plate.

7. The combination of claim 6 which includes means for adjusting the slide block relative to the eccentric.

8. The combination of claim 1 in which each drive assembly includes a shaft which is inclined in a plane substantially transverse to the machine, and means are provided for adjusting the inclination of the shaft.

9. The combination of claim 1 which includes beater finger mounting sockets on the carrier means, each said mounting socket comprising an elastic sleeve which receives an end portion of a beater finger.

10. A machine for gathering fruit from plants comprising, in combination:
    a wheeled chassis;
    a frame on said chassis which defines a tunnel oriented longitudinally of the chassis;
    closure means mounted on the lower part of said frame closing the base of said tunnel, said closure means being movable away from the longitudinal axis of the vehicle to allow the plants to pass therethrough;
    a pair of brackets within and extending longitudinally along the sides of the tunnel;
    a plurality of groups of beater fingers disposed in longitudinally spaced relationship on each of said brackets, each of said groups including,
    a. a shaft journalled in the bracket,
    b. a crank and an eccentric pin on the shaft,
    c. a connecting rod which has one end portion operatively connected to the eccentric pin and the other end portion movably connected to the bracket,
    d. carrier means on said connecting rod, and
    e. a plurality of resilient beater fingers mounted on said carrier means;
    and means for driving all of said shafts.

* * * * *